United States Patent [19]

Luise

[11] Patent Number: 5,124,413
[45] Date of Patent: Jun. 23, 1992

[54] FILMS OR SHEETS OF BLENDS OF AMORPOUS POLY(ARYL ETHER KETONES) WITH POLYARYLATES AND LAMINATES THEREOF

[75] Inventor: Robert R. Luise, Boothwyn, Pa.

[73] Assignee: E. I. Du Pont de Nemours and Company, Wilmington, Del.

[21] Appl. No.: 581,996

[22] Filed: Sep. 13, 1990

[51] Int. Cl.⁵ .................. C08L 67/03; C08L 65/00
[52] U.S. Cl. ...................... 525/448; 525/419; 525/437
[58] Field of Search .................. 525/437, 448

[56] References Cited

U.S. PATENT DOCUMENTS

| | | | |
|---|---|---|---|
| 4,438,236 | 3/1984 | Cogswell et al. | 525/165 |
| 4,704,448 | 11/1987 | Brugel | 528/125 |
| 4,816,556 | 3/1989 | Gay et al. | 528/176 |
| 5,011,894 | 4/1991 | Robeson | 525/437 |

FOREIGN PATENT DOCUMENTS 0170067  2/1986  European Pat. Off. .

Primary Examiner—Patricia Short
Attorney, Agent, or Firm—Paul R. Steyermark

[57] ABSTRACT

A melt-processable, miscible or partially miscible blend of an amorphous, isotropic polyarylate with a poly(ether ketone ketone) that does not possess a sharp or well defined melting endotherm by differential scanning calorimetry when observed on second heating under defined conditions can be extruded into sheets useful in aircraft panels and in other applications that require high burn resistance and good melt processability.

10 Claims, No Drawings

FILMS OR SHEETS OF BLENDS OF AMORPOUS POLY(ARYL ETHER KETONES) WITH POLYARYLATES AND LAMINATES THEREOF

BACKGROUND OF THE INVENTION

This invention relates to films or sheets made of blends of certain amorphous poly(aryl ether ketones) with polyarylates and to laminates of such films or sheets with polyvinyl fluoride (PVF) films or sheets.

Poly(aryl ether ketones) are a well known class of engineering polymers that have outstanding mechanical properties and low flammability. Because of that, they are particularly well suited in certain high value applications, such as, for example, in panels used in aircraft interiors.

Poly(aryl ether ketones) generally are known to fall into three classes, poly(ether ketones) (PEKs), poly(ether ether ketones) (PEEKs), and poly(ether ketone ketones) (PEKKs). PEKKs are a valuable class of poly(aryl ether ketones).

The most commonly commercially available PEKKs contain the following repeating unit (1):

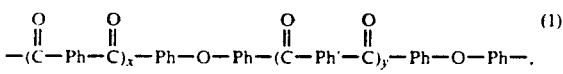

where Ph stands for 1,4-phenylene; Ph' stands for 1,3-phenylene; and x and y are positive numbers.

Such PEKKs usually are made, either directly or indirectly, from diphenyl ether and a mixture of terephthalyl (T) chloride and isophthalyl (I) chloride of varying T/I ratios.

Many such PEKKs are described, for example, in U.S. Pat. Nos. 3,516,966 to Berr, 3,767,620 to Angelo et al., 4,816,556 to Gay et al., and 4,720,537 and 4,704,448 to Brugel.

Depending on their T/I ratios, PEKKs are either partly crystalline or amorphous. Crystalline PEKKs have a melting point of about 330° C. or higher. Melt processability of PEKKs also depends to some extent on the T/I ratio, but normally processing temperatures in excess of 300° C. are required.

Polyarylates also are well known. These may be crystalline and frequently anisotropic, exhibiting liquid crystal properties, or amorphous and isotropic. Polyarylates of interest in the present invention are amorphous and isotropic. They are polyesters of dihydroxyaromatic compounds such as, for example, dihydroxybenzenes, 2,2-bis(4-hydroxyphenyl)propane also known as bisphenol A, dihydroxydiphenyls, and dihydroxynaphthalenes and dicarboxylic aromatic acids such as, for example, phthalic acids or naphthalenedicarboxylic acids. A typical polyarylate is one based on bisphenol A and isophthalic acid or a mixture of isophthalic and terephthalic acids. Such polyarylates are described and referenced, among others, in U.S. Pat. No. 4,886,875 to Gay et al. The glass transition temperature (Tg) of polyarylates normally is within the range of about 120–190° C., and they are well melt-processable.

Certain blends of PEKKs with other polymers are known, for example, from U.S. Pat. Nos. 4,816,556 to Gay et al. and 4,720,537 to Brugel. The latter specifically mentions blends of certain PEKKs with polyarylates made from a bisphenol and an aromatic dicarboxylic acid.

European Patent Application 0 170 067 of Union Carbide Corporation discloses blends of a crystalline poly(aryl ether ketone) with a polyarylate and/or a liquid crystalline polyarylate. Those blends are said to have significantly higher notched izod impact strength and tensile impact strength than those of either unblended constituent. This European patent application also reports that addition of liquid crystalline polyarylates unexpectedly decreases melt flow (increases melt viscosity), while U.S. Pat. No. 4,438,236 had earlier stated that addition of small amounts of liquid crystalline polymers to many other polymer systems increased melt flow (decreased melt viscosity).

While many poly(aryl ether ketones), including a number of PEKKs, are crystalline, thermoformable amorphous sheets of certain PEKKs as well as their laminates with polyvinyl fluoride sheets are known. The former are described in the copending patent application Ser. No. 07/283,695 of J. S. Bloom, while the latter are described in her U.S. Pat. No. 4,937,135. Such amorphous sheets are made from PEKKs with a properly controlled T/I isomer ratio by quenching extruded sheets at a controlled cooling rate.

Although both the thermoformable PEKK sheets and their laminates with polyvinyl fluoride sheets are of considerable commercial importance, the cost of such sheets is quite high. It thus would be desirable to provide a blend of PEKK with another, less expensive, polymer, which would not impair the outstanding mechanical properties of PEKK and possibly would improve some of its properties or would improve its processability, as compared with PEKK alone.

SUMMARY OF THE INVENTION

According to this invention, there is provided a readily melt-processable, miscible or partially miscible blend of about 10–90 weight percent, preferably 50–70 weight percent, of an amorphous, isotropic polyarylate derived from a reaction of one or more dihydric phenols with one or more aromatic dicarboxylic acids with 90–10 weight percent, preferably 30–50 weight percent, of a poly(ether ketone ketone) having repeating units of the above formula (1), in which x is a number selected from the ranges consisting of 0–40% of (x+y) and 55–65% of (x+y), preferably about 55–65% of (x+y), especially 60% of (x+y), and y is a number selected from the ranges of 60–100% of (x+y) and 35–45% of (x+y), preferably 35–45% of (x+y), especially 40% of (x+y).

For the purpose of this invention, the term "amorphous" means that the materials do not possess a sharp or well-defined melting endotherm by differential scanning calorimetry (DSC) when observed on second heating under nitrogen at a rate of 20° C. per minute or more, after the specimen has been initially heated in the calorimeter at a rate of 20° C. or more per minute from room temperature to 370° C., then cooled to 100° C. at a rate of 20° C. per minute or more. A typical instrument that can be used for this purpose is the Du Pont ® 9900 calorimeter.

The term "miscible" means that the blend possesses a single glass transition temperature, as measured by DSC. This single glass transition temperature usually lies within the range defined by the glass transition temperatures of the component blend polymers, as measured by the step change in the DSC trace on second heating according to the above technique. Miscible blends, as defined herein, can be extruded into transparent films.

The term "partially miscible" means that two distinct glass transition temperatures are observed under these conditions, both of them shifted with respect to the glass transition temperatures of the individual blend component polymers.

The blends useful in the practice of the present invention always are amorphous according to the above definition, whether they are completely or only partially miscible.

DETAILED DESCRIPTION OF THE INVENTION

The blends of the present invention have improved processability when compared with the corresponding neat PEKK and can be formed into films having improved transparency and heat release/burning properties. All amorphous polyarylates are suitable in the practice of the invention, although the proportions in which they can be blended with PEKK will vary, depending on the particular polyarylate. Preferred polyarylates include those derived from resorcinol, hydroquinone, or bisphenol A, or mixtures thereof, with isophthalic or a mixture of isophthalic and terephthalic acids. The inherent viscosity of the polyarylate should be in the 0.4-1.0 range, preferably 0.50-0.75, as measured at a temperature of 30° C. in a solution in a 25/75 v/v mixture of trifluoroacetic acid and methylene chloride at a concentration of 0.5 g/dl. This procedure is described in detail in F. Billmeyer, *Textbook of Polymer Science*, John Wiley & Sons, 1962, page 79. The poly(ether ketone ketone) should have a melt index of 10-80, preferably 20-50, at 340° C., according to ASTM D-1238. Bisphenol A polyarylate in which the dicarboxylic acid component is isophthalic acid is completely miscible with PEKK in blends containing less than 30% of the former. It is partially miscible at a level of 30-70%. The corresponding resorcinol-based polyarylate appears to be miscible in all proportions.

The preferred PEKK has a T/I isomer ratio of about 60:40 because it produces completely amorphous blends with amorphous polyarylates. By comparison, blends of PEKK T/I 50:50 with the same polyarylates are crystalline and cannot be extruded into sheet.

The addition of an amorphous polyarylate to PEKK produces a blend which has improved processability, as compared with PEKK alone. For example, neat PEKK may be processable at an extruder temperature in excess of 340° C., while a blend with a polyarylate will be melt-processable at 300-315° C. The addition of PEKK to polyarylate suppresses dripping during burning and lowers the heat release of the polyarylate. On the other hand, the polyarylate accelerates charring of the PEKK in burning.

The blends of the present invention find use, among others, in aircraft interior panels and in other applications requiring high burn resistance and good melt-processablity.

Other compounding additives may be present in the blend, including stabilizers and antioxidants such as, for example, phosphites; pigments such as, for example, titanium dioxide; reinforcing agents such as, for example, glass, carbon, and aramid fibers, or minerals; and ultraviolet light stabilizers.

In all processing operations, it is important to dry the components sufficiently to minimize unwanted hydrolytic degradation. Operating temperatures should be consistent with obtaining a fluid melt but minimizing thermal degradation of the blend. Melt blending may be accomplished with standard polymer melt mixing devices such as a Brabender ® mixer, a Farrel ® continuous mixer, a Buss ® Kneader, a single screw extruder, or preferably a twin screw extruder. The openings or ports of the mixing device should be blanketed with an inert gas to protect the molten blend from air exposure.

The blends can be processed into many useful objects or shapes, including sheets, film, rods, tubes, parisons, and other shapes, by normal melt-fabricating processes, including direct extrusion, thermoforming, blow-molding, and injection-molding. Because of the relatively low cost of polyarylates, as compared with PEKKs, these blends provide comparable performance to PEKKs alone, but at a lower cost.

It is crucial to the success of the present invention that PEKK used in the blends be amorphous. Within the specified T/I isomer ratio, this will always be the case. Crystalline PEKKs are not miscible with amorphous polyarylates according to the definition of miscibility used herein.

Such miscible blends are extrudable at lower temperatures than semi-crystalline blends. Completely miscible blends possess the additional advantage of film transparency.

This invention is now illustrated by certain representative examples thereof, where all parts, proportions, and percentages are by weight unless otherwise indicated. All measurements in units other than SI have been converted to the corresponding SI units.

EXAMPLE 1

Preparation of an amorphous, miscible blend of a polyarylate based on poly(m-phenylene isophthalate/terephthalate 50:50) with a PEKK made from 4,4'-diphenyl ether and phthalyl chlorides having a T/I isomer ratio of 60:40 and of a transparent film thereof.

Pelletized and dried polyarylate having an inherent viscosity of 0.72, 4.54 kg, was dry-blended with 4.54 kg of dried, pelletized PEKK having a melt index of 37. The blend was compounded in a 28 mm Werner & Pfleiderer (W&P) twin screw extruder, with barrel temperature set at 335° C. and extruded through a 6.3 mm circular die at a rate of 7.76 kg per hr. The extrudate was quenched in a water bath at ambient temperature. The pelletized extrudate after drying exhibited a single glass transition temperature of 143.5° C. on second heating by DSC, as compared with a glass transition temperature of 145.3° C. for the neat polyarylate and 154.9° C. for the neat PEKK. No sharp melting endotherm was observed in either case.

The pelletized blend was dried and extruded through a W&P 28 mm twin-screw extruder equipped with a 25.4 mm flex-lip film die. Barrel temperature was set at 315° C. while the adapter/die temperature was 337° C. The transparent film of a 33 micrometer thickness obtained in this step was wound up at 6.1 m/min at a drum temperature of 48.9° C.

Another batch of a similar pelletized blend was extruded through a 25.4 mm Brabender ® screw extruder equipped with a 20.3 mm tape die, with barrel temperature also set at 315° C. Uniform sheet of a 177.8 mm width and a 1.016 mm thickness was prepared. The sheet was laminated to a 51 micrometer film of polyvinyl fluoride fluorocarbon resin (Du Pont, Tedlar ®) by hot-pressing at 152° C. The resulting composite sheet was vacuum-thermoformed at 193° C. into a cup having a diameter of 9.4 cm and height of 3.6 cm.

COMPARATIVE EXAMPLE

A pelletized blend of 50 % polyarylate similar to that used in Example 1, except that its inherent viscosity was 0.70, 43.5 % of commercial crystalline poly(ether ether ketone) (PEEK), Victrex ® 450G (ICI), believed to be derived from diphenyl ether and terephthalyl chloride, and 6.5% TiO2 pigment (Du Pont, R101®) was prepared in a manner similar to that of Example 1. The blend had a sharp DSC melting endotherm at 336.4° C. on second heating; the neat PEEK had a sharp endortherm at 339.6° C. The blend could not be extruded into a uniform sheet as in Example 1 at extruder temperatures up to 350 C.

EXAMPLE 3

Demonstration of low burn/heat release properties of amorphous polyarylate/PEKK blends.

Pelletized blends of a polyarylate of the type used in Example 1, having inherent viscosity of 0.70, and 10, 30, and 50% of PEKK of the type used in Example 1 containing 13% of TiO$_2$ (Du Pont, R101 ®) were prepared according to the general procedure described above. The blends contained, respectively, 91.1%, 72.9%, and 59.9% of polyarylate. They were amorphous as determined by DSC, with single glass transition temperatures of 142.7° C., 144.1° C., and 146.0° C., respectively, on second heating. The glass transition temperature of the neat polyarylate is 143.8° C., and that of the PEKK is 157.8° C.

The blends were extruded into a uniform sheeting of 1.016 mm thickness at zone temperature settings of 315° C. The sheeting was cut into 15.2×15.2 cm plaques, and the plaques were laminated to a 51 micrometer film of polyvinylidene fluoride fluorocarbon resin (Du Pont, Tedlar®) by hot-pressing at 152° C. The resulting composite plaques were subjected to a test known in the industry as the Ohio State University Heat Release Test and is embodied in 1986 amendments to Part 25-Airworthiness Standards-Transport Category Airplanes of Title 14, Code of Federal Regulations (51 Federal Register 26206, July 21, 1986 and 51 Federal Register 28422, Aug. 7, 1986). To the extent necessary for the understanding of this test, the above-cited amendments are incorporated herein by reference. The peak heat release rate over a 5-minute burn period and the total heat release over the first two minutes of the burn were measured with the following results:

| Polyarylate, % | Peak, KW-min/m$^2$ | Total, KW/m$^2$ |
| --- | --- | --- |
| 100 (0% PEKK) | 75 | 80 |
| 91.1 | 69 | 74 |
| 72.9 | 52 | 63 |
| 59.9 | 48 | 47 |
| 0 (100% PEKK) | 40 | 0 |
| FAA Requirement for 1990 | <65 | <65 |

As mentioned earlier in this disclosure, the blends of this invention are suitable for the manufacture of aircraft interior panels. In addition to various specifications which such panels must meet from the standpoint of their physical properties, they also must be able to pass the low burn and heat release requirements of Federal Aviation Administration. It is seen that the addition of PEKK to polyarylate is effective in reducing the peak and total heat release of the polyarylate to levels below the 1990 FAA requirements for aircraft interiors. Moreover, unacceptable dripping observed in the case of neat polyarylate is not observed in the case of the blends. The PEKK, therefore, acts as a drip suppressant. In addition, the polyarylate appears to accelerate charring of the PEKK in the initial stages of burning, as evidenced by the unexpected accelerated (nonlinear) reduction in peak heat release rate with increasing PEKK content of the blends.

EXAMPLE 4

Preparation of miscible and partially miscible blends of bisphenol A isophthalate polyarylate with PEKK having a T/I isomer ratio of 60/40.

Blends, 1.81 kg, of the polyarylate having an inherent viscosity of 0.51, and of the PEKK having a melt index of 27, were dry blended in the following respective ratios: 30/70, 50,50, and 70/30. The blends were extruded in a 28 mm twin-screw extruder, with zone temperature settings of 330° C., at a throughput of about 4.5 kg/hr. These blends and their component polymers had the following glass transition temperatures determined by DSC on second heating:

| Polyarylate/PEKK | Glass Trans. Temp., °C. |
| --- | --- |
| 30/70 | 157.3 |
| 50/50 | 157.8, 169.1 |
| 70/30 | 160.3, 172.5 |
| 100% PEKK | 157.6 |
| 100% Polyarylate | 179.7 |

At the 30/70 level, the polymers were completely miscible, while at the 50/50 and 70/30 levels, they formed two miscible phases indicative of partial miscibility. All these blends could be extruded into sheets using standard methods.

I claim:

1. A readily melt-processable, miscible, or partially miscible amorphous blend of about 10–70 weight percent of an amorphous, isotropic polyarylate derived from a reaction of one or more dihydric phenols with one or more aromatic dicarboxylic acids with a complementary amount of 90–30 weight percent of an amorphous poly(ether ketone ketone) having repeating units of the following formula

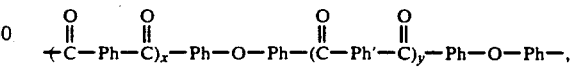

where Ph stands for 1,4-phenylene;Ph' stands for 1,3-phenylene; and x and y are positive numbers, x being a number selected from the ranges consisting of (x+y)(0 to 40)/100 and (x+y)(55 to 65)/100, and y is a number selected from the ranges of (x+y)(60 to 100)/100 and (x+y)(35 to 45)/100, the amorphous condition of the poly(ether ketone ketone) being determined by differential scanning calorimetry when observed on second heat under nitrogen at a rate of 20° C. or more per minute, after the specimen has been initially heated in the calorimeter at a rate of 20° C. or more per minute from room temperature to 370° C., then cooled to 100° C. at a rate of 20° C. or more per minute.

2. A blend of claim 1 wherein x is a number from 55(x+y)/100 to 65(x+y)/100, and y is a number from 35(x+y)/100 to 45(x+y)/100.

3. A blend of claim 2 wherein x is about 60(x+y)/100, and y is about 40(x+y)/100.

4. A blend of claim 1 wherein the polyarylate is a mixed polyester of bisphenol A with terephthalic and isophthalic acids.

5. A blend of claim 1 wherein the polyarylate is a polyester of at least one dihydroxybenzene with isophthalic acid or a mixture of isophthalic acid with terephthalic acid.

6. A completely miscible blend of claim 1.
7. A completely miscible blend of claim 2.
8. A completely miscible blend of claim 4.
9. A completely miscible blend of claim 5.
10. A blend of claim 1 wherein the amount of polyarylate is 50–70 weight percent and the amount of poly(ether ketone ketone) is 30–50 weight percent.

* * * * *